(12) United States Patent
Thielker et al.

(10) Patent No.: US 11,735,812 B2
(45) Date of Patent: Aug. 22, 2023

(54) AIRCRAFT COMPRISING A MULTIPLICITY OF ANTENNA ARRANGEMENTS

(71) Applicant: Airbus Operations GmbH, Hamburg (DE)

(72) Inventors: Patrick Thielker, Hamburg (DE); Christian Schaupmann, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 231 days.

(21) Appl. No.: 16/953,848

(22) Filed: Nov. 20, 2020

(65) Prior Publication Data

US 2021/0257723 A1 Aug. 19, 2021

(30) Foreign Application Priority Data

Nov. 29, 2019 (DE) .......................... 102019132524.2

(51) Int. Cl.
*H01Q 1/28* (2006.01)
*B64F 5/60* (2017.01)
(Continued)

(52) U.S. Cl.
CPC ............... *H01Q 1/286* (2013.01); *B64C 1/36* (2013.01); *B64D 47/02* (2013.01); *B64F 5/60* (2017.01);
(Continued)

(58) Field of Classification Search
CPC .......... H01Q 1/06; H01Q 1/283; H01Q 1/286; H01Q 1/40; H01Q 1/42; H01Q 1/525;
(Continued)

(56) References Cited

U.S. PATENT DOCUMENTS 2,503,109 A * 4/1950 Harris ................... H01Q 1/286
343/705
9,761,939 B2 9/2017 Pietila et al.
(Continued)

FOREIGN PATENT DOCUMENTS

DE 102018109723 A1 10/2019
EP 2993130 A1 * 3/2016
EP 3133694 A2 2/2017

OTHER PUBLICATIONS

German Search Report; priority document.

*Primary Examiner* — Robert Karacsony
(74) *Attorney, Agent, or Firm* — Greer, Burns & Crain, Ltd.

(57) ABSTRACT

An aircraft comprising a skin, a multiplicity of antenna arrangements, each of which is arranged in a different region of a corresponding multiplicity of mutually spaced regions of the skin and comprises an antenna element that is arranged and configured to emit radio waves into a surrounding area of the aircraft, and a multiplicity of visual indicators, each of which is assigned to a different antenna arrangement of the antenna arrangements. Each of the visual indicators is arranged on the skin or on the antenna arrangement in the region of the skin in which the assigned antenna arrangement is situated in such a manner that it is visible from outside the aircraft and emits light during operation in an on state.

17 Claims, 1 Drawing Sheet

(51) Int. Cl.
  *B64C 1/36* (2006.01)
  *B64D 47/02* (2006.01)
  *H01Q 1/42* (2006.01)
  *H01Q 1/52* (2006.01)

(52) U.S. Cl.
  CPC ............... *H01Q 1/42* (2013.01); *H01Q 1/525* (2013.01); *B64D 2203/00* (2013.01)

(58) Field of Classification Search
  CPC ...... B64C 1/36; B64D 47/02; B64D 2203/00; B64F 5/60
  See application file for complete search history.

(56) References Cited

U.S. PATENT DOCUMENTS

2018/0351243 A1  12/2018  Lewis et al.
2019/0326665 A1  10/2019  Juergens et al.

\* cited by examiner

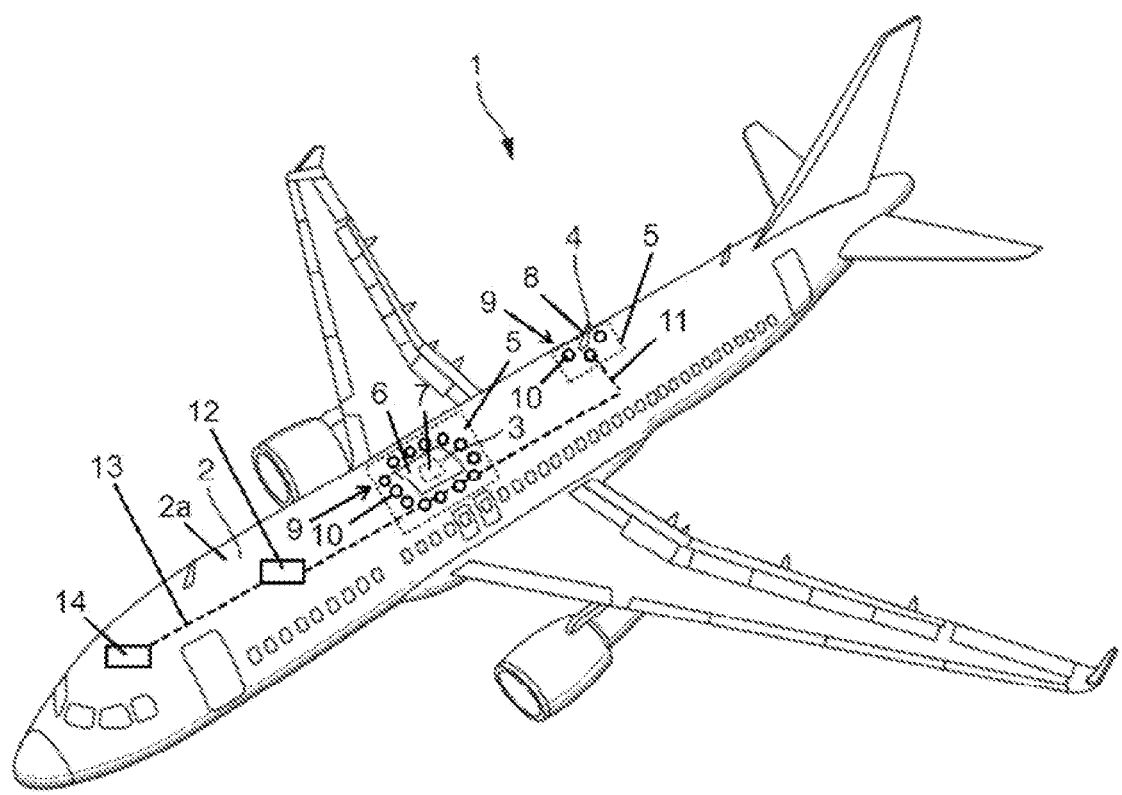

– 1 –
AIRCRAFT COMPRISING A MULTIPLICITY OF ANTENNA ARRANGEMENTS

CROSS-REFERENCES TO RELATED APPLICATIONS

This application claims the benefit of the German patent application No. 102019132524.2 filed on Nov. 29, 2019, the entire disclosures of which are incorporated herein by way of reference.

FIELD OF THE INVENTION

The present invention relates to an aircraft comprising a skin and a multiplicity of antenna arrangements, each of which is arranged in a different region of a corresponding multiplicity of mutually spaced regions of the skin and comprises an antenna element that is arranged and adapted to emit radio waves into a surrounding area of the aircraft.

BACKGROUND OF THE INVENTION

Aircraft typically comprise one or more antennas, by means of which a radio link can be established between the aircraft and external equipment or users on the ground or in the air, for instance other aircraft or satellites. In particular, aircraft can have a very large number of such antennas for various purposes, and it is expected in the future that the number will increase further still. The antennas are arranged at different points of the aircraft and can be located, for example, not just on top of the fuselage of the aircraft but also, for instance, on the sides, the underside or the rear of the fuselage, or on the wings or the tail units.

In addition, in the prior art such antennas were installed not just on the outside of the aircraft, and therefore protruding outwards from the aircraft into the air surrounding the aircraft, but also, for instance, in apertures in the aircraft skin that are closed by flush-fitting covers, or in such a way that antenna elements of these antennas are integrated directly in the aircraft skin by having been provided as a layer of a multilayer skin.

As a result of the increasing number of antennas and as a result of providing antennas that are arranged in apertures in the skin or integrated in the skin, maintenance work on the antennas has become more time-consuming because it is harder to locate an antenna intended for maintenance.

SUMMARY OF THE INVENTION

An object of the present invention is therefore to design an aircraft of the type mentioned in the introduction such that maintenance of the antenna arrangements can be performed easily and economically, and to define a method for controlling an operating procedure of such an aircraft.

According to the present invention, an aircraft is provided that has a skin and a multiplicity of antenna arrangements. The skin provides an exterior surface of the aircraft in the usual manner. It can comprise skin portions from one, a plurality, or all of different portions of the aircraft, for instance from the fuselage, the wings, the engines, the tail unit, high-lift elements and/or control surfaces. Each of the multiplicity of antenna arrangements is arranged in a different region of a corresponding multiplicity of mutually spaced regions of the skin and comprises an antenna element that is arranged and adapted to emit radio waves from the associated region of the skin into a surrounding area of the aircraft. It is possible that the antenna element comprises a plurality of sub-antenna elements which during operation of the associated antenna arrangement interact in order to emit the radio waves. Whether or not this is the case, the antenna element of one, a plurality, or all of the antenna arrangements may be a KU-band, KA-band or L-band antenna, for example.

The aircraft also comprises a multiplicity of visual indicators. Each of these visual indicators is assigned to a different antenna arrangement of the antenna arrangements, and is arranged or installed on the skin or on the antenna arrangement in the region of the skin in which the assigned antenna arrangement is situated in such a manner that it is visible from outside the aircraft. In addition, each of the visual indicators is designed such that it emits light during operation in an on state. The emitted light can therefore be perceived by people in the surrounding area of the aircraft, i.e., from outside the aircraft. For this purpose, each of the visual indicators can preferably comprise a light element or a plurality of light elements, each of which is adapted to output light and, in particular, light of one or more predefined colors. In a preferred embodiment, the light elements are LEDs or units comprising a plurality of LEDs, for instance different LEDs for different colors.

This embodiment of the aircraft has the advantage that the location of the antenna arrangement and its antenna elements on the aircraft can be found very easily by means of the light emission from their respectively assigned visual indicator, and indeed even when an antenna arrangement, or its antenna element, is arranged in an aperture in the skin or is embedded in the skin.

In a preferred embodiment, for each of the antenna arrangements, the visual indicator assigned thereto is arranged such that when viewed perpendicularly from above from the surrounding area onto the region of the skin in which the associated antenna arrangement is situated, it at least partially surrounds or bounds the antenna element of the antenna arrangement, in particular in a plane of the skin or a plane parallel thereto, and/or is arranged at least in part above the antenna element. This embodiment allows the location of the particular antenna arrangement or of its antenna element to be identified particularly easily and precisely.

It is possible that the visual indicators always emit light continuously in the same manner once the aircraft is supplied with electrical power, or permanently if the visual indicators have an autonomous power source such as a rechargeable or non-rechargeable battery. In a preferred embodiment, however, the aircraft additionally comprises one or more controllers, each of which is assigned to one or more of the visual indicators and is adapted to control the light emission therefrom selectively. It is possible in this case that a dedicated controller is provided for each of the visual indicators, just a single controller is provided for all the visual indicators, or there are a plurality of controllers, each of which is provided for a subset of the visual indicators. Whatever the case, it is possible that each of the controllers is a controller designed solely for controlling the assigned visual indicator or visual indicators. Alternatively, it is possible that each of the controllers is a controller designed also to control the assigned antenna arrangement(s) and/or to control other functions of the aircraft. Moreover, whatever the case, each of the controllers can be connected, e.g., via a data bus or a data line, for instance a coaxial cable or an optical fiber, to the assigned visual indicator or visual indicators in order to send control signals thereto for the purpose of the described control of the visual indicators.

In embodiments in which the aircraft comprises one or more such controllers, it is also preferred if each of the controllers is adapted to switch its assigned visual indicator or visual indicators on and off selectively. For this purpose, the aircraft can comprise, for instance, one or more operator controls, each of which is connected to one or more of the controllers and is adapted to allow a user to switch on and off selectively the visual indicators that are assigned to the associated controller(s). In this case, the operator control(s) and the controller(s) are preferably designed such that each of the visual indicators can be switched selectively on and off individually or separately, or subsets of the visual indicators can be selectively switched on and off in groups. Embodiments are also possible, however, in which all the visual indicators can be switched on and off only collectively, or at any rate also collectively. All of these embodiments have the advantage that the visual indicators can normally be off, in order to save energy. If, however, a procedure is meant to be carried out such as a maintenance procedure, for instance, for which one of the antenna arrangements must be located, the assigned visual indicator can be switched on for all the antenna arrangements, some of the antenna arrangements or preferably just for the antenna arrangement intended for maintenance, so that it emits light in any event or, as explained below, at least on additional conditions being satisfied such as the antenna element of the antenna arrangement intended for maintenance not emitting any radio waves for instance.

Alternatively or additionally to providing one or more operator controls, it is possible that each of the controllers is adapted to detect at least one predefined event, and on detecting the at least one predefined event, to switch on or off individually, in groups, or in their entirety, the visual indicators assigned to such controller. An example of such an event may be the occurrence of a fault or defect or of one from a plurality of predefined fault operating states of one of the antenna arrangements. The event can be detected by one of the controllers, for example on the basis of signals or messages that the controller concerned receives from the antenna arrangements or from an airborne computer such as a central airborne computer, for instance. For this purpose, the controllers are connected to the antenna arrangements and/or to the airborne computer(s), and adapted to evaluate the signals or messages received therefrom and, in response to the signals or messages, to identify a fault or a fault operating state.

In embodiments in which the aircraft comprises one or more of the described controllers, it is also preferred if each of these controllers is adapted to control each of its assigned visual indicators as a whole or preferably selectively individually according to a current operating state of the antenna arrangement to which the particular visual indicator is assigned such that the visual indicator indicates an operating state from a group of at least two different operating states of the antenna arrangement, which operating state corresponds to the current operating state. In this case, each of the at least two different operating states is assigned a different predefined light emission by the visual indicator, so that the operating states can be distinguished from one another on the basis of the different light emission. In addition, the group of at least two different operating states comprises an operating state in which the antenna arrangement is on or active but the antenna element is not emitting any radio waves, and/or preferably an operating state in which the antenna arrangement is off or inactive (again in this case the antenna element of the antenna arrangement is not emitting any radio waves). It is possible that an actual light emission is assigned just to the two latter operating states, and preferably just to the last-mentioned operating state, and the light emission ceases entirely in all other operating states. Then an antenna arrangement can be located only if its antenna element is not emitting any radio waves or if preferably the antenna arrangement is off or inactive, and thus approaching the antenna arrangement is possible without being exposed to the radio waves. Preferably, however, one light emission then another actually takes place for each of the operating states from the group. It is then still possible safely and easily not only to identify where a certain antenna arrangement is located but also whether it is possible to approach it without being exposed to radio waves being emitted from its antenna element.

In a preferred form of these embodiments, in which embodiments different operating states can be distinguished from one another on the basis of the different light emission, each of the visual indicators comprises one or more light elements such as preferably an LED or LEDs or a unit or units having a plurality of LEDs. Each of the light elements is adapted to output selectively light of one color from a plurality of predefined colors. The controller assigned to the particular visual indicator is adapted to control the visual indicator such that the indication of different operating states out of the group of at least two different operating states comprises the light element(s) emitting light of various colors from the predefined colors. If a visual indicator comprises a plurality of light elements, it is possible that for each of the operating states from the group, all of the light elements emit light of the same color or different subsets of the light elements emit light of different colors.

Alternatively or additionally, each of the visual indicators can preferably comprise one or more light elements such as preferably an LED or LEDs or a unit or units having a plurality of LEDs. This light element or these light elements can be the same light element(s) as in the aforementioned embodiment or else a different light element or different light elements. In either case, each of these light elements is adapted to output selectively light in a temporal light pattern from a plurality of predefined temporal light patterns. The temporal light patterns may comprise a continuous light and various flashing patterns, for example. The controller assigned to the particular visual indicator is adapted to control the visual indicator such that the indication of different operating states out of the group of at least two different operating states comprises the light element(s) emitting light in various temporal light patterns from the predefined temporal light patterns. If a visual indicator comprises a plurality of light elements, it is possible that all the light elements each emit light using the same temporal light pattern, or that different subsets of the light elements emit light using different temporal light patterns.

Moreover, alternatively or additionally, each of the visual indicators can preferably comprise a multiplicity of light elements such as preferably LEDs or units having a plurality of LEDs. These light elements may comprise the light element(s) of the two previous embodiments or else other light elements. In either case, the controller assigned to the particular visual indicator is adapted to control the visual indicator such that the indication of different operating states out of the group of at least two different operating states comprises switching on and off the individual light elements of the multiplicity of light elements in different patterns. Different operating states are thereby indicated by different spatial light patterns.

To summarize, in the above-described embodiments in which different operating states can be distinguished from one another on the basis of the different light emission, the indication of different operating states can therefore preferably be achieved by different colors, different spatial light patterns and/or different temporal light patterns. It is thereby possible in an easy and flexible manner to indicate a multiplicity of different operating states and to identify and distinguish said operating states from one another on the basis of the light emission.

In a preferred form of the embodiments described above, in which embodiments different operating states can be distinguished from one another on the basis of the different light emission, the group of at least two different operating states comprises an operating state in which the antenna element of the associated antenna arrangement is emitting radio waves and/or a fault operating state or a plurality of different fault operating states of the associated antenna arrangement. Indication of one of the fault operating states of an antenna arrangement can take place after manual activation of the corresponding visual indicator by means of the aforementioned operator control, or else automatically (as also described above) after detection of an event characteristic of the particular fault operating state.

In a preferred embodiment, the antenna element of one, a plurality, or all of the antenna arrangements is embedded in the skin.

In a preferred embodiment, the antenna element of one, a plurality, or all of the antenna arrangements is arranged on the outside of the skin, for instance under a radome, on the inside of the skin, or in an aperture in the region of the skin in which the antenna arrangement is situated. In this or other embodiments, the antenna element can be installed, for example, on or in the skin or on one or more stiffening members supporting the skin. In particular, in this embodiment for one, a plurality, or all of the antenna arrangements the associated region of the skin can comprise an aperture in which the antenna element is arranged, wherein the antenna arrangement seals the aperture and sits flush with an outer surface of the skin. Such an antenna arrangement can comprise, for example, a cover that is transparent to the radio waves emitted by the antenna element, which cover seals the aperture and sits flush with the outer surface of the skin in the region.

By virtue of the described embodiment of an aircraft it is easily possible to control different operating procedures of the aircraft. Thus the present invention also provides a method for controlling an operating procedure of an aircraft according to one of the embodiments and forms described above, in which method the operating procedure is performed according to a light emission by at least one of the visual indicators.

The operating procedure may be, for example, a maintenance procedure on one of the antenna arrangements, in which case the method comprises, prior to performing the maintenance procedure, ascertaining by means of the light emission by the visual indicator assigned thereto the location of the antenna arrangement or of its antenna element, and then performing the maintenance procedure on this antenna arrangement. As explained, it is possible that the visual indicators emit light continuously. As also explained, it is preferred however if all or some of the visual indicators, and in particular only the visual indicator assigned to the antenna arrangement intended for maintenance, are/is switched on by means of the described controller(s) and, in particular, by means of the described operator control(s) in order to emit light.

The operating procedure may also be, for example, a maintenance or deicing procedure on the aircraft or a passenger embarkation or disembarkation procedure, in which case the method comprises using the light emission by one or more of the visual indicators to ascertain whether the assigned antenna arrangement(s) is/are in an operating state in which the antenna element of the antenna arrangement(s) is not emitting any radio waves. The maintenance, deicing and/or embarkation or disembarkation procedure is not carried out until it has been ascertained that the assigned antenna arrangement(s) is/are in an operating state in which the antenna element of the at least one antenna arrangement is not emitting any radio waves. Thus people carrying out the maintenance or deicing procedure or people accompanying the passenger embarkation or disembarkation procedure can easily and reliably prevent themselves or passengers from approaching an antenna arrangement whose antenna element is emitting radio waves.

The operating procedure may also be, for example, a maintenance procedure on one of the antenna arrangements, in which case the method comprises using the light emission by the visual indicator assigned thereto to ascertain, prior to performing the maintenance procedure, whether the antenna arrangement has a fault. The maintenance procedure is then performed on the antenna arrangement if the visual indicator indicates that the antenna arrangement has a fault. Otherwise the maintenance procedure is not performed. As explained, it is possible that the visual indicators emit light continuously. As also explained, it is preferred however if all or some of the visual indicators, and, in particular, only the visual indicator assigned to the antenna arrangement intended for maintenance, are/is switched on by means of the described controller(s) and, in particular, by means of the described operator control(s) in order to emit light, on the basis of which a fault can then be identified if applicable. If a fault exists, it is possible, as also already explained, to identify as well from the light emission the location of the antenna arrangement or of its antenna element. If there is no fault, this can be indicated, as described, as a correct operating state by a light emission assigned to this operating state.

The operating procedure may also be, for example, a maintenance procedure on one of the antenna arrangements, in which case the method comprises using the light emission by the visual indicator assigned thereto to ascertain, prior to performing the maintenance procedure, one fault operating state of a plurality of possible fault operating states of the antenna arrangement. The maintenance procedure is then performed on the antenna arrangement according to the ascertained fault operating state. As explained, it is possible that the visual indicators emit light continuously. As also explained, it is preferred however if all or some of the visual indicators, and, in particular, only the visual indicator assigned to the antenna arrangement intended for maintenance, are/is switched on by means of the described controller(s) and, in particular, by means of the described operator control(s) in order to emit light, on the basis of which, one of the fault operating states can then be identified if applicable. If one of the fault operating states is present, it is possible, as also already explained, to identify as well from the light emission the location of the antenna arrangement or of its antenna element. If none of the fault operating states is present, this can be indicated, as described, as a correct operating state by a light emission assigned to this operating state.

BRIEF DESCRIPTION OF THE DRAWINGS

The invention is described below in greater detail with reference to the FIGURE, which shows an exemplary embodiment of the aircraft.

The FIGURE shows a schematic perspective view of an exemplary embodiment of an aircraft according to the invention.

DETAILED DESCRIPTION OF THE PREFERRED EMBODIMENTS

An aircraft 1 shown in the FIGURE comprises a fuselage 2 and a plurality of antenna arrangements 3 and 4, which are arranged on or in a skin 2a of the fuselage 2. Additional antenna arrangements are also visible in the FIGURE, but for reasons of clarity are not shown in detail nor given reference signs. Moreover, yet more antenna arrangements can be provided on the aircraft, for instance antenna arrangements on the sides of the fuselage 2, on the underside of the fuselage 2, on the wings, on the tail units or on the engines. All of the antenna arrangements that are not shown or not shown in detail can, however, have the same design as the antenna arrangements 3 and 4 and, in particular, can each be equipped with a visual indicator in the manner described below for the antenna arrangements 3 and 4.

Each of the two antenna arrangements 3, 4 is arranged in a corresponding region 5 of the skin 2a. The regions 5 of the different antenna arrangements 3, 4 are spaced apart from one another, i.e., the different antenna arrangements 3, 4 are spaced apart from one another.

The antenna arrangement 3 comprises an aperture (not shown separately) in the skin 2a, which is sealed by a cover 6 that sits flush with the outer surface of the skin 2a. Under the cover 6 in the region of the aperture is arranged an antenna element 7, which is adapted to emit radio waves into the surrounding area of the aircraft 1 through the cover 6, which is transparent to these radio waves. In the FIGURE, the antenna arrangement 3 is arranged on top of the fuselage 2 by way of example. As already stated, however, the antenna arrangement 3 can also be situated at any other point of the fuselage 2, for instance on a side or on the underside or on other portions of the aircraft 1, for instance on the wings, the tail units or the engines. By virtue of the cover 6 being arranged flush, or substantially flush, in the aperture in the skin 2a, the antenna arrangement 3 does not increase, or not significantly increase, the air resistance of the fuselage 2, and therefore there are no, or substantially no, increased aerodynamic loads acting on the antenna arrangement 3.

In contrast, the antenna arrangement 4 comprises as the antenna element 8, a conventional blade antenna, which is fastened externally on the fuselage 2 and protrudes outwards from the fuselage 2 into the surrounding area of the aircraft 1.

Each of the two antenna arrangements 3 and 4 is assigned a separate visual indicator 9, which surrounds the associated antenna arrangement 3 and 4 respectively and its antenna element 7 and 8 respectively in the plane defined by the surface of the skin 2a. For this purpose, each of these visual indicators 9 comprises a multiplicity of light elements in the form of multicolor LEDs 10, which are mounted on the skin 2a in an arrangement surrounding the respective antenna arrangements 3 and 4 in such a way that they can emit light into the surrounding area of the aircraft 1 and are visible to people in the surrounding area of the aircraft.

Furthermore, each of the two visual indicators 9 is connected to a controller 12 via a bus line 11. This controller 12 is adapted to control selectively each of the visual indicators 9 separately in order to switch them on and off, and, in the on state, to specify the color of the light emitted by the light elements 10. The controller 12 is in turn connected to the airborne computer 14 via a line 13.

The airborne computer 14 comprises an operator control (not shown separately), by means of which the controller 12 can be instructed by an operator selectively either to switch on or off all the visual indicators 9, or to switch on or off specifically just one required visual indicator of the visual indicators 9. The controller 12 is additionally configured to control the associated visual indicator 9 or each of the associated visual indicators 9 such that, in the on state, their light elements 10 emit a color that depends on the current operating state of the antenna arrangement 3 or 4 assigned to the visual indicator 9 concerned. This operating state is signaled by the airborne computer 14 to the controller 12 via the line 13. It must be mentioned that instead of the embodiment shown in the FIGURE, embodiments are advantageously also possible in which the controller 12 can also be integrated in the airborne computer 14, or the function thereof provided directly by the airborne computer 14. In addition, in further advantageous embodiments, the described functions of the airborne computer 14 and of the controller 12 can also be integrated jointly in another device such as an antenna controller or an amplifier, for instance.

If the operating state is an operating state in which the antenna arrangement 3 or 4 is not faulty but is off, and thus its antenna element 7 or 8 respectively is not emitting any radio waves, the corresponding visual indicator 9 is controlled, for instance, such that its light elements 10 emit green light. If, on the other hand, the operating state is an operating state in which the antenna arrangement 3 or 4 is on, and its antenna element 7 or 8 respectively is emitting radio waves, the corresponding visual indicator 9 is controlled, for instance, such that its light elements 10 emit red light, and specifically emit a continuous light if for the antenna arrangement 3 or 4 there is no error message present in the airborne computer 14, and a flashing light if an error message for the antenna arrangement 3 or 4 is present in the airborne computer 14. It can also be provided that different flashing patterns signal different faults. If the operating state is an operating state in which an error message for the antenna arrangement 3 or 4 is present in the airborne computer 14, and the antenna arrangement 3 or 4 is off, and thus its antenna element 7 or 8 respectively is not emitting any radio waves, the corresponding visual indicator 9 is controlled, for instance, such that its light elements 10 output light in different colors and/or temporal light-output patterns, for instance different flashing patterns, according to the fault operating state corresponding to the error message. The controller 12 can also be adapted to perform the latter control automatically independently of any switch-on by a user by means of the operator control of the airborne computer 14, i.e., an error message for one of the antenna arrangements 3 or 4 received or ascertained by the airborne computer 14 initiates the switch-on of the corresponding visual indicator and the signaling of the fault operating state by the light output.

Hence in each case, people in the surrounding area of the aircraft 1 can easily identify first that it is possible to approach the antenna arrangement 3 or 4 concerned without being exposed to radio waves emitted by this antenna arrangement. This is advantageous for example when maintenance work or a deicing procedure must take place in the region of the particular antenna arrangement 3 or 4, or when, during an embarkation or disembarkation procedure, passengers must move through a region in the surrounding area of the aircraft 1 situated in the vicinity of one or more of the antenna arrangements. People who must perform such maintenance work or deicing procedures or who oversee or give clearance to a passenger embarkation or disembarkation procedure, can first, in the manner described, switch on the visual indicators 9 of all the antenna arrangements 3, 4 or just of individual antenna arrangements 3, 4, and ascertain first from the color of the emitted light that the corresponding antenna arrangements 3, 4 are off before they start the work or give clearance for passengers to embark or disembark.

Furthermore, it is immediately identifiable whether an antenna arrangement 3, 4 is working correctly or whether there is a fault, and what fault exists.

It must be mentioned that instead of the light elements in the form of multicolor LEDs, it is also possible to provide a multiplicity of light elements in the form of single-color LEDs, and each visual indicator 9 comprises LEDs of different colors. The output of different colors is then controlled by switching on the relevant LEDs systematically.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft comprising:
   a skin;
   a multiplicity of antenna arrangements, each of which is arranged in a different region of a corresponding multiplicity of mutually spaced regions of the skin and comprises an antenna element that is arranged and configured to emit radio waves into a surrounding area of the aircraft;
   a multiplicity of visual indicators, each of which is assigned to a different antenna arrangement of the antenna arrangements; and
   at least one controller, the at least one controller being assigned to one or more of the visual indicators and being adapted to control a light emission therefrom,
   wherein each of the visual indicators is arranged on the skin or on the antenna arrangement in a region of the skin in which the assigned antenna arrangement is situated in such a manner that the visual indicator is visible from outside the aircraft and emits light during operation in an on state,
   wherein each of the at least one controllers is configured to control each visual indicator assigned to that controller according to a current operating state of the antenna arrangement to which the particular visual indicator is assigned such that the visual indicator indicates an operating state from a group of at least two different operating states of the antenna arrangement, which operating state corresponds to the current operating state.

2. The aircraft as claimed in claim 1, in which for each of the antenna arrangements, the visual indicator assigned thereto is arranged such that when viewed perpendicularly from above from a surrounding area onto the region of the skin in which the antenna arrangement is situated, the visual indicator at least one of at least partially surrounds the antenna element of said antenna arrangement or is arranged, at least in part, above the antenna element.

3. The aircraft as claimed in claim 1, in which each of the at least one controllers is configured to switch its assigned one or more visual indicators on and off selectively.

4. The aircraft as claimed in claim 3, which additionally comprises at least one operator control, which is connected to the at least one controller and is configured to allow a user to switch the visual indicators on and off selectively.

5. The aircraft as claimed in claim 1,
   wherein each of the at least two different operating states is assigned a different predefined light emission by the visual indicator, and
   wherein the group of at least two different operating states comprises at least one of:
      an operating state in which the antenna arrangement is on or active but the antenna element is not emitting any radio waves, and
      an operating state in which the antenna arrangement is off or inactive.

6. The aircraft as claimed in claim 5, wherein
   each of the visual indicators comprises at least one light element which is adapted to output selectively light of one color from a plurality of predefined colors, and
   the controller assigned to the particular visual indicator is configured to control the visual indicator such that the indication of different operating states out of the group of at least two different operating states comprises the at least one light element emitting light of various colors from the predefined colors.

7. The aircraft as claimed in claim 5, wherein
   each of the visual indicators comprises at least one light element, which is configured to output selectively light in a temporal light pattern from a plurality of predefined temporal light patterns, and
   the controller assigned to the particular visual indicator is configured to control the visual indicator such that the indication of different operating states out of the group of at least two different operating states comprises the at least one light element emitting light in various temporal light patterns from the predefined temporal light patterns.

8. The aircraft as claimed in claim 5, wherein
   each of the visual indicators comprises a multiplicity of light elements, and
   the controller assigned to the particular visual indicator is configured to control the visual indicator, such that the indication of different operating states out of the group of at least two different operating states comprises switching on the individual light elements of the multiplicity of light elements in different patterns.

9. The aircraft as claimed in claim 5, wherein at least one of
   the group of at least two different operating states comprises an operating state in which the antenna element of the associated antenna arrangement is emitting radio waves, or
   one or more fault operating states of the associated antenna arrangement.

10. The aircraft as claimed in claim 1, wherein the antenna element of at least one of the antenna arrangements is embedded in the skin.

11. The aircraft as claimed in claim 1, wherein the antenna element of at least one of the antenna arrangements is arranged on an outside of the skin, on an inside of the skin, or in an aperture in the region of the skin in which the antenna arrangement is situated.

12. The aircraft as claimed in claim 11, wherein for at least one of the antenna arrangements, the associated region of the skin comprises an aperture in which the antenna element is arranged, wherein the antenna arrangement seals the aperture and sits flush with an outer surface of the skin.

13. A method for controlling an operating procedure of an aircraft comprising a skin, a multiplicity of antenna arrangements, each of which is arranged in a different region of a corresponding multiplicity of mutually spaced regions of the skin and comprises an antenna element that is arranged and configured to emit radio waves into a surrounding area of the aircraft, and a multiplicity of visual indicators, each of which is assigned to a different antenna arrangement of the antenna arrangements, wherein each of the visual indicators is arranged on the skin or on the antenna arrangement in a region of the skin in which the assigned antenna arrangement is situated in such a manner that the visual indicator is visible from outside the aircraft and emits light during operation in an on state, the method comprising:

performing the operating procedure according to a light emission by at least one of the visual indicators, wherein the operating procedure comprises a maintenance procedure on one of the antenna arrangements, and, wherein prior to performing the maintenance procedure, the location of the antenna arrangement is ascertained with the light emission by the visual indicator assigned to the antenna arrangement concerned, and the maintenance procedure is then performed on the antenna arrangement.

14. The method as claimed in claim 13, further comprising:

including ascertaining by means of the light emission by at least one of the visual indicators whether the at least one assigned antenna arrangement is in an operating state in which the antenna element of the at least one antenna arrangement is not emitting any radio waves, and the operating procedure is not carried out until the step of ascertaining results in a determination that the at least one assigned antenna arrangement is in an operating state in which the antenna element of the at least one antenna arrangement is not emitting any radio waves.

15. The method as claimed in claim 13, wherein prior to performing the maintenance procedure, a step of ascertaining by means of the light emission by the visual indicator assigned thereto whether the antenna arrangement has a fault is performed, and the maintenance procedure is then performed on the antenna arrangement if the visual indicator indicates that the antenna arrangement has a fault.

16. The method as claimed in claim 13, wherein prior to performing the maintenance procedure, a fault operating state from a plurality of possible fault operating states of the assigned antenna arrangement is ascertained by means of the light emission by the visual indicator assigned thereto, and the maintenance procedure is then performed on the antenna arrangement according to the ascertained fault operating state.

17. An aircraft comprising:

a skin;

a multiplicity of antenna arrangements, each of which is arranged in a different region of a corresponding multiplicity of mutually spaced regions of the skin and comprises an antenna element that is arranged and configured to emit radio waves into a surrounding area of the aircraft;

a multiplicity of visual indicators, each of which is assigned to a different antenna arrangement of the antenna arrangements; and at least one controller, the at least one controller being assigned to one or more of the visual indicators and being adapted to control a light emission therefrom, in which each of the at least one controllers is configured to switch its assigned one or more visual indicators on and off selectively; and at least one operator control, which is connected to the at least one controller and is configured to allow a user to switch the visual indicators on and off selectively, wherein each of the visual indicators is arranged on the skin or on the antenna arrangement in a region of the skin in which the assigned antenna arrangement is situated in such a manner that the visual indicator is visible from outside the aircraft and emits light during operation in an on state.

* * * * *